(12) United States Patent
Dugan et al.

(10) Patent No.: US 7,089,234 B2
(45) Date of Patent: Aug. 8, 2006

(54) COMMUNICATING STATE INFORMATION IN A NETWORK EMPLOYING EXTENDED QUERIES AND EXTENDED RESPONSES

(75) Inventors: Robert J. Dugan, Hyde Park, NY (US); John R. Flanagan, Poughkeepsie, NY (US); Giles R. Frazier, Austin, TX (US); Roger G. Hathorn, Tucson, AZ (US); Catherine C. Huang, Poughkeepsie, NY (US); William H. Miller, Newburgh, NY (US)

(73) Assignee: International Business Machines Corporation, Armonk, NY (US)

( * ) Notice: Subject to any disclaimer, the term of this patent is extended or adjusted under 35 U.S.C. 154(b) by 430 days.

(21) Appl. No.: 10/209,261

(22) Filed: Jul. 31, 2002

(65) Prior Publication Data
US 2004/0024759 A1  Feb. 5, 2004

(51) Int. Cl.
*G06F 17/30* (2006.01)
(52) U.S. Cl. .............................. 707/4; 707/3; 707/104.1
(58) Field of Classification Search ................ 707/10, 707/104.1; 370/351, 219, 422, 230, 252, 370/468, 54, 400, 406; 709/201; 714/4; 710/36
See application file for complete search history.

(56) References Cited

U.S. PATENT DOCUMENTS

| | | | |
|---|---|---|---|
| 5,519,704 A | 5/1996 | Farinacci et al. ........... 370/402 |
| 5,678,004 A | 10/1997 | Thaweethai ................. 712/201 |
| 5,926,463 A | 7/1999 | Ahearn et al. .............. 370/254 |
| 6,091,720 A * | 7/2000 | Bedard et al. .............. 370/351 |
| 6,170,023 B1 * | 1/2001 | Beardsley et al. ............ 710/36 |
| 6,201,791 B1 | 3/2001 | Bournas ...................... 370/234 |
| 6,226,678 B1 | 5/2001 | Mattaway et al. .......... 709/230 |
| 6,301,257 B1 | 10/2001 | Johnson et al. ............. 370/406 |
| 6,304,549 B1 * | 10/2001 | Srinivasan et al. ......... 370/230 |
| 6,445,678 B1 * | 9/2002 | Bard .......................... 370/219 |
| 6,473,782 B1 * | 10/2002 | Casper et al. ............... 709/201 |
| 6,567,808 B1 * | 5/2003 | Eschelbeck et al. .......... 707/10 |
| 6,609,165 B1 * | 8/2003 | Frazier ........................ 710/36 |
| 6,636,982 B1 * | 10/2003 | Rowlands ....................... 714/4 |
| 6,731,646 B1 * | 5/2004 | Banks et al. ................. 370/422 |
| 6,769,008 B1 * | 7/2004 | Kumar et al. ............... 709/201 |

* cited by examiner

*Primary Examiner*—Jeffrey Gaffin
*Assistant Examiner*—Yicun Wu
(74) *Attorney, Agent, or Firm*—Eugene I. Shkurko, Esq.; Kevin P. Radigan, Esq.; Heslin Rothenberg Farley & Mesiti, P.C.

(57) ABSTRACT

State information is communicated in a network to more efficiently utilize network resources. A first node forms a single extended query requesting state information from at least one logical image of a second node. The extended query is a single query requesting state information for multiple logical images of the first node. The requested state information includes the status of logical paths previously established between the multiple logical images of the first node and the at least one logical image of the second node. Upon sending the extended query to the second node, a single extended response can be formed at the second node having the requested state information.

33 Claims, 9 Drawing Sheets fig. 1 fig. 2 fig. 5

*600*

LOGICAL PATH FIELD - BASIC

| WORD | CONTENTS |
|------|----------|
| 0 | LOGICAL PATHS 0 - 31 |
| 1 | LOGICAL PATHS 32 - 63 |
| 2 | LOGICAL PATHS 64 - 95 |
| 3 | LOGICAL PATHS 96 - 127 |
| 4 | LOGICAL PATHS 128 - 159 |
| 5 | LOGICAL PATHS 160 - 191 |
| 6 | LOGICAL PATHS 192 - 223 |
| 7 | LOGICAL PATHS 224 - 255 |

LOGICAL PATH FIELD – EXTENDED

| WORD | CONTENTS |
|---|---|
| 0 | LOGICAL PATHS 0 – 31 |
| 1 | LOGICAL PATHS 32 – 63 |
| 2 | LOGICAL PATHS 64 – 95 |
| 3 | LOGICAL PATHS 96 – 127 |
| 4 | LOGICAL PATHS 128 – 159 |
| 5 | LOGICAL PATHS 160 – 191 |
| 6 | LOGICAL PATHS 192 – 223 |
| 7 | LOGICAL PATHS 224 – 255 |
| 8 | LOGICAL PATHS 256 – 287 |
| 9 | LOGICAL PATHS 288 – 319 |
| ⋮ | ⋮ |
| 2032 | LOGICAL PATHS 64,992 – 65,023 |

*fig. 6B* fig. 7 fig. 8 fig. 9

COMMUNICATING STATE INFORMATION IN A NETWORK EMPLOYING EXTENDED QUERIES AND EXTENDED RESPONSES

TECHNICAL FIELD

This invention relates in general to communications within a network computing environment, and in particular, to a technique for sharing state information between nodes in a network having multiple logical images. Specifically, this technique utilizes extended queries and extended responses to communicate state information between nodes.

BACKGROUND OF THE INVENTION

In a network computing environment that includes nodes, an event, such as a disruption, can cause the state of one or more nodes to change. When such an event occurs, each node needs to ascertain whether the state of the nodes with which it was communicating has changed. This determination is necessary in order to reallocate resources that are attached to nodes that may no longer be operational after the event.

A node communicates with another node via logical paths, which are relationships established between logical images residing in each node. A logical image is a partition of a node that has the logical appearance of that node from the standpoint of network functionality. When one node determines the state of another node (i.e., the state of the logical images of another node), it acquires the status of the logical paths between their respective logical images.

Today, to determine the state of a node, each logical image within a node sends a "query" packet to each other node with which it was recently communicating. For networks such as a FICON-based network offered by International Business Machines Corporation of Armonk, N.Y., a node may have to send as many as 256 queries to a single node, since there may be up to 256 FICON logical images in the sending node. With potentially each node in the network sending this many queries, performance degradation could possibly occur after a disruption in a large network.

Thus, a need exists in the communications art for an enhanced ability for communicating state information between network nodes having multiple logical images.

SUMMARY OF THE INVENTION

The shortcomings of the prior art are overcome and additional advantages are provided through the provision in one aspect of a method of ascertaining state information in a network. The method includes, for instance, forming an extended query at a first node requesting state information from at least one logical image of a second node, wherein the extended query includes a single query requesting the state information for a plurality of logical images of the first node; and sending the extended query from the first node to the second node.

In an enhanced aspect of the present invention, the method of communicating state information further includes forming an extended response at the second node, responsive to the extended query from the first node, wherein the extended response includes state information of the at least one logical image of the second node.

Systems, computer program products and data structures corresponding to the above summarized methods are also described and claimed herein.

Aspects of the present invention advantageously enable additional information to be included in a query packet sent from a first node and requesting state information from a second node. This additional information defines an extended query which identifies multiple logical images of the first node for which information is requested. By identifying multiple logical images, a single extended query can be used to request state information that under current technology requires multiple queries. Thus, using extended queries, the number of transmissions following an event, such as a network disruption, decreases significantly. By decreasing the network traffic following a disruption, performance degradation due to network traffic congestion can be avoided.

Other aspects of the present invention offer similar advantages by allowing a response from the second node to include composite information, thereby defining an extended response. This composite information includes the status of logical paths between multiple logical images of the first node and one or more logical images of the second node. Since, under current technology, a response provides status information relative to only one logical image of the first node, a single extended response replaces multiple prior responses. Thus, extended responses further mitigate network congestion following a state-changing event.

Additional features and advantages are realized through the techniques of the present invention. Other embodiments and aspects of the invention are described in detail herein and are considered a part of the claimed invention.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

BEST MODE FOR CARRYING OUT THE INVENTION

In accordance with an aspect of the present invention, an enhanced capability is provided for communicating state information between nodes in a network computing environment. As one example, a first node, such as a channel, requires state information from a second node, for instance, a control unit. This state information may be required because an event, such as a network disruption, may have caused a change in the state of the control unit. Prior to the event, the channel has multiple logical images from which multiple logical paths are established to at least one logical image of the control unit. After the event, the channel forms a single extended query which requests state information from the at least one logical image of the control unit, and sends that query to the control unit. After receiving the extended query, the control unit can form a single extended response which includes the requested state information. The state information includes, for example, the status of the previously established logical paths.

Figure 1:
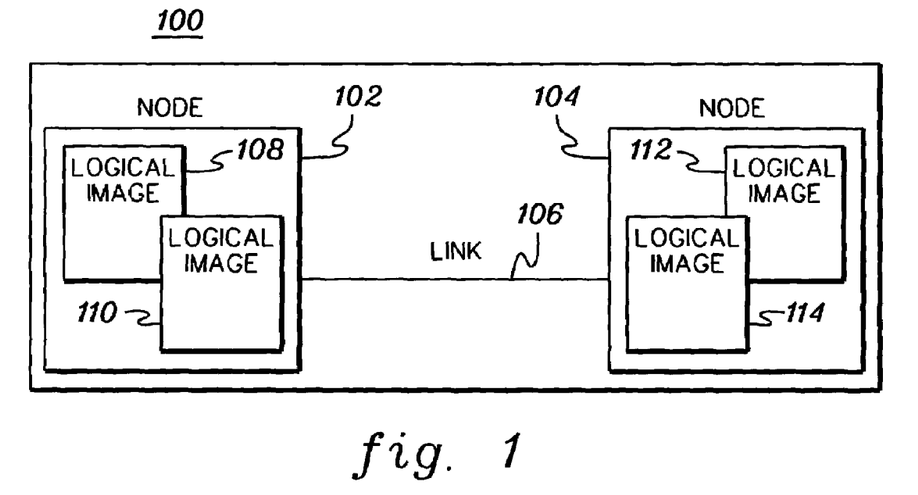
FIG. 1 depicts one embodiment of a network computing environment including a point-to-point configuration and incorporating and using one or more aspects of the present invention.

One embodiment of a network computing environment 100 incorporating and using one or more aspects of the present invention is depicted in FIG. 1. As one example, network computing environment 100 includes a node 102 and a node 104 coupled by a link 106. Node 102 includes multiple logical images 108 and 110 and node 104 includes multiple logical images 112 and 114.

Nodes 102 and 104 are, for example, a channel and control unit pair, or they may be both channels or both control units. A channel is, for example, a host computer that performs functions to provide access to I/O devices by means of control units or emulated control units. The functions performed by a channel are defined by the Fibre Channel Single-Byte Command Code Sets-2 Mapping Protocol Rev. 2.1 (FC-SB-2), American National Standard for Information Technology, which is hereby incorporated by reference in its entirety. A channel may be implemented by, for example, a System/390 or zSeries 900 computer offered by International Business Machines Corporation of Armonk, N.Y.

A control unit is a physical or emulated entity that is coupled to one or more I/O devices and allows those I/O devices to be coupled to a channel. One example of a control unit is a Shark Enterprise Storage Server, offered by International Business Machines Corporation. I/O devices include, for instance, printers, magnetic tape units and direct-access storage units.

When a node is a channel, the logical images within it are channel images. When a node is a control unit, the included logical images are control unit images.

Further details regarding the functioning of the nodes and logical images are described below with reference to FIG. 2.

Figure 2:
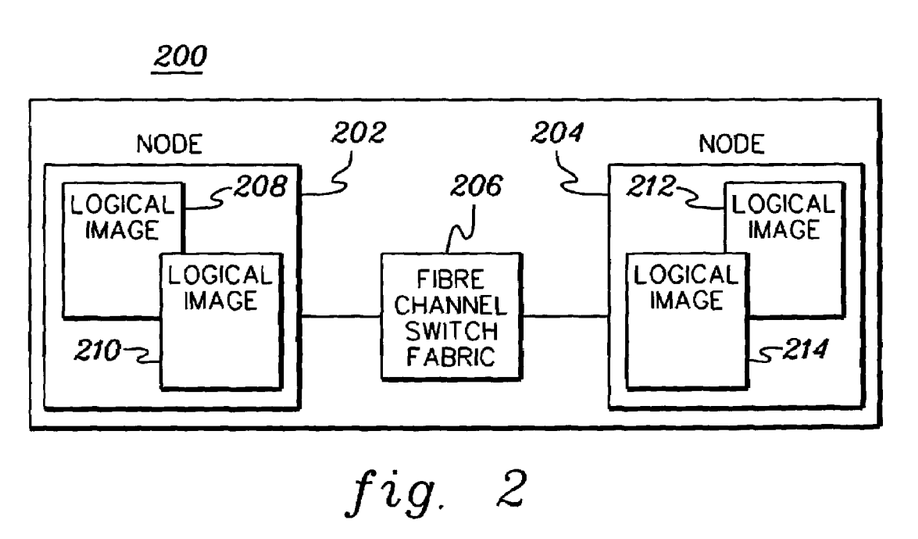
FIG. 2 depicts one embodiment of a network computing environment including a fibre channel switch fabric, in accordance with one or more aspects of the present invention.

Another embodiment of a network computing environment 200 incorporating and using one or more aspects of the present invention is depicted in FIG. 2. Network computing environment 200 includes a node 202 coupled to a node 204 via fibre channel switch fabric 206. One example of a fibre channel switch fabric 206 is a FICON Director offered by International Business Machines Corporation. Node 202 includes multiple logical images 208 and 210 and node 204 includes multiple logical images 212 and 214. Nodes 202 and 204 may be implemented as described above with respect to FIG. 1.

Multiple logical paths establish relationships between logical images 208 and 210 and logical images 212 and 214. As one example, node 202 is a channel and node 204 is a control unit that has experienced a state change. To determine the state of the control unit by checking the status of the logical paths, the channel sends a query called a test initialization packet (TIN). The control unit includes the required status information in a response called a test initialization result packet (TIR).

As used herein, a TIN may be basic or extended. A basic TIN packet is described in the above-referenced document FC-SB-2, which is again incorporated by reference in its entirety. Further details pertaining to a basic TIN are described below with reference to FIGS. 3, 3A and 3B; while details concerning an extended TIN (in accordance with an aspect of the present invention) are described below with reference to FIGS. 4, 4A and 4B. An extended TIN packet is broadly described herein as an extended query.

Also as used herein, a TIR may be basic or extended. Again, FC-SB-2, previously incorporated by reference, includes a description of a basic TIR packet. Additional details regarding a basic TIR are described below with reference to FIGS. 5 and 6A, while details of an extended TIR (in accordance with an aspect of the present invention) are described below with reference to FIGS. 5 and 6B. As used herein, an extended TIR packet is broadly described as an extended response.

Figure 3:
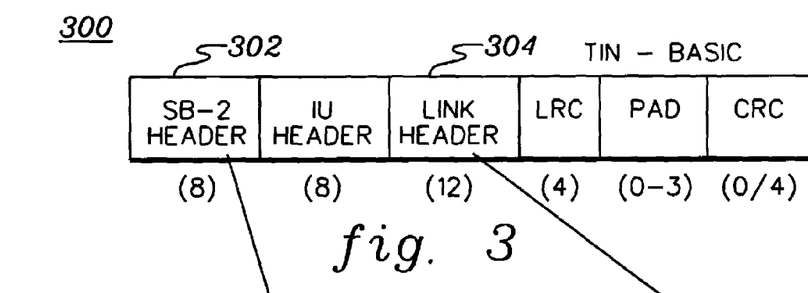
FIG. 3 depicts one embodiment of a basic test initialization packet, in accordance with one or more aspects of the present invention.

FIG. 3 depicts one example of a basic TIN packet 300. Basic TIN packet 300 includes, for example, the following fields: SB-2 Header 302 identifying the logical image sending the TIN; information unit information (IU Header) associating the command with a control block containing an I/O request; Link Header 304 containing the reserved field that distinguishes a basic TIN from an extended TIN; longitudinal redundancy check (LRC) providing a check code for redundancy in certain TIN fields; PAD providing extra bytes to pad fields; and cyclic redundancy check (CRC) providing a word-aligned 32-bit redundancy check code. Further details regarding SB-2 Header 302 and Link Header 304 are described below in relation to FIGS. 3A and 3B, respectively.

Figure 3A:
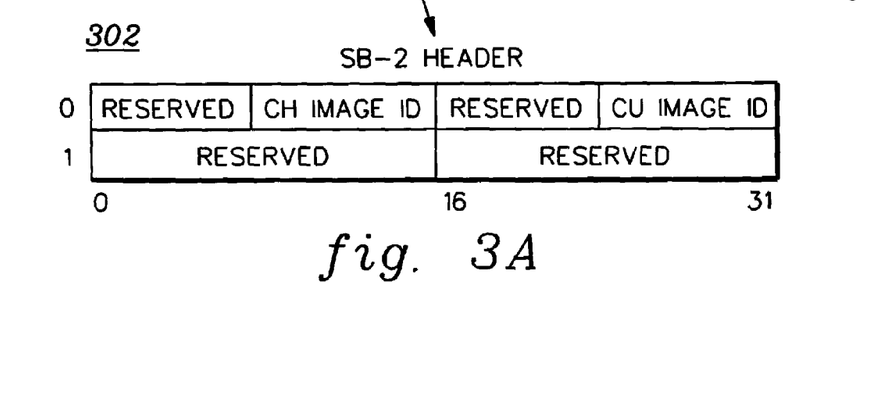
FIGS. 3A and 3B depict further details of fields of the basic test initialization packet of FIG. 3, in accordance with one or more aspects of the present invention.

Referring to FIG. 3A, one example of an SB-2 Header 302 is depicted. SB-2 Header 302 includes a channel image ID (CH Image ID) designating an 8-bit ID of the channel image; a control unit image ID (CU Image ID) designating an 8-bit ID of the control unit image; as well as four reserved fields. When a channel sends a basic TIN, the control unit image ID is set to zero and the channel image ID field specifies the logical path whose status is to be tested. When a control unit sends a basic TIN, the channel image ID is set to zero and the control unit image ID specifies the logical path whose status is to be tested.

Figure 3B:
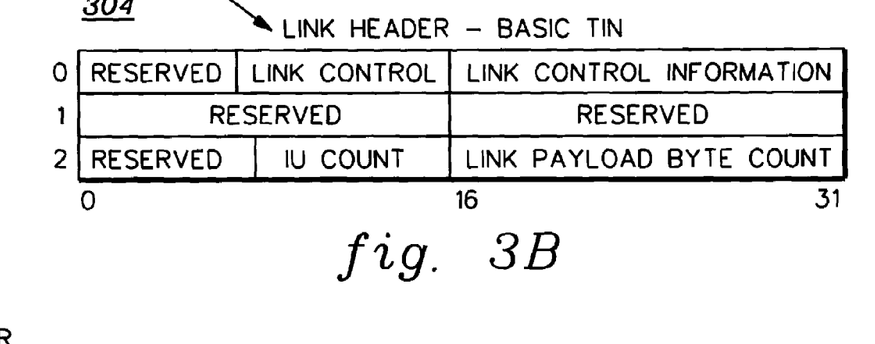

One example of a Link Header 304 in a basic TIN is depicted in FIG. 3B. Link Header 304 includes the following fields: link control, link control information, IU (information unit) count, link payload byte count, and four reserved fields. The link control field identifies the link control function and the other fields include parameters necessary to perform the specified function. The reserved bytes, including the first byte, are set to zero by the node that sends the basic TIN and ignored by the node that receives it.

Figure 4:
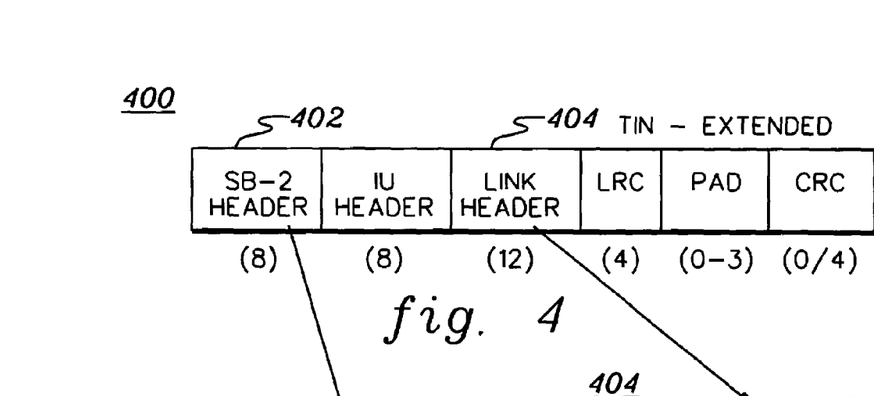
FIG. 4 depicts one embodiment of an extended test initialization packet, in accordance with one or more aspects of the present invention.

One example of an extended TIN is shown in FIG. 4. Extended TIN 400 includes fields with the same names and byte lengths as the basic TIN 300 depicted in FIG. 3, including an SB-2 Header 402 and a Link Header 404. However, there are differences. Examples of the differences between the contents and functionality of the basic TIN and the extended TIN are discussed below.

Figure 4A:
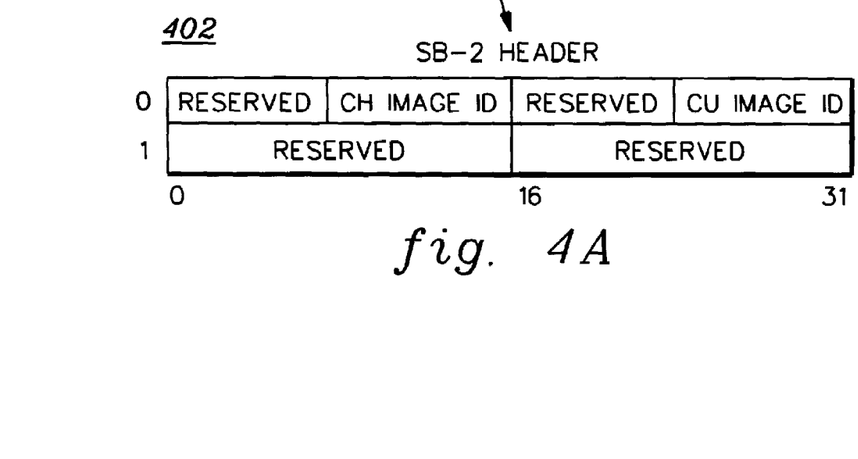
FIGS. 4A and 4B depict further details of one embodiment of fields of the extended test initialization packet of FIG. 4 in accordance with one or more aspects of the present invention.

FIG. 4A depicts one example of the fields within an SB-2 Header 402. The field names of SB-2 Header 402 are the same as those of SB-2 Header 302 shown in FIG. 3A. However, the functionality of the channel image ID (CH Image ID) and control unit image ID (CU Image ID) fields in FIG. 4A differ from the similarly named fields shown in FIG. 3A.

Figure 4B:
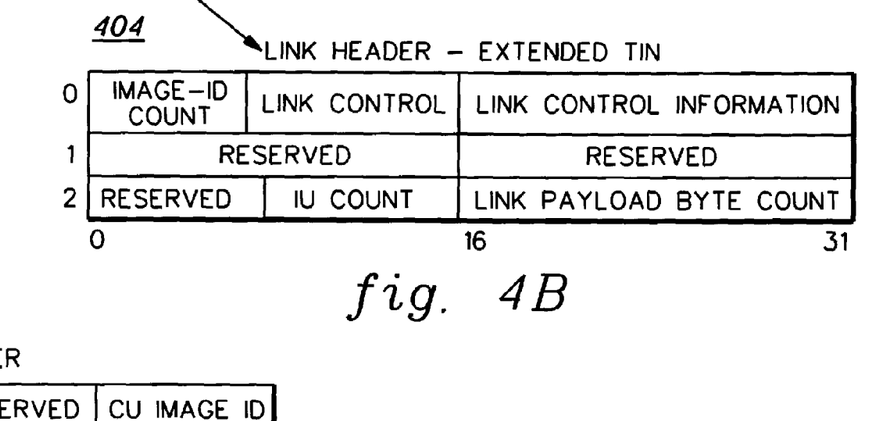

When a channel sends an extended TIN, the control unit image ID in SB-2 Header 402 is set to zero and the channel image ID field specifies a first logical path of a set of logical paths whose status is to be tested. The range of this set of logical paths is determined by the channel image ID, together with an image-ID count which resides in the first byte of the Link Header 404, as shown in FIG. 4B. The image-ID count is interpreted as an 8-bit binary integer, and the value in the field may range from 0 to 253. For example, if the set of logical paths to be tested starts with the logical paths established at the channel image identified by the channel image ID 2 and ends with the logical paths established at the channel image identified by the channel image ID 8, the extended TIN would include a channel image ID of 2 and an image-ID count of 6.

When a control unit sends an extended TIN, the channel image ID in SB-2 Header 402 is set to zero and the control unit image ID specifies the first of a set of logical paths to be tested for status. This set of logical paths is determined by the control unit image ID as shown in FIG. 4A, together with the image-ID count of the Link Header 404, as shown in FIG. 4B.

Figure 5:
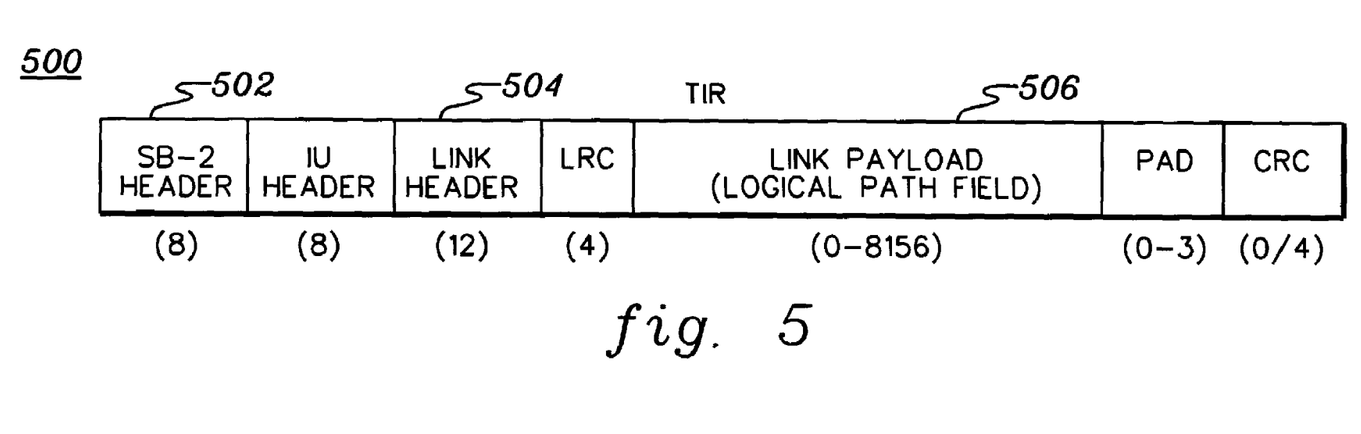
FIG. 5 depicts one embodiment of a logical path field in a test initialization result packet, in accordance with one or more aspects of the present invention.

Examples of a basic TIR and an extended TIR are both described below with reference to FIG. 5. A TIR 500, as shown in FIG. 5, includes fields with the same names and byte lengths as basic TIN 300 depicted in FIG. 3, including an SB-2 Header 502 and a Link Header 504. In addition to the fields it has in common with basic TIN 300, TIR 500 also includes a Link Payload 506. Link Header 504 includes a link control field (not shown) that specifies the test initialization result. Link Payload 506 contains a logical path field, which distinguishes a basic TIR from an extended TIR, and which is described below in detail with reference to FIGS. 6A and 6B.

If a channel sends a basic TIR, the control unit image ID field of SB-2 Header 502 is the same as the control unit image ID received in the TIN. The channel image ID field of SB-2 Header 502 is set to zero and ignored by the control unit. If a control unit sends the basic TIR, the channel image ID field in the SB-2 Header is the same as the channel image ID field received in the TIN and the control unit image ID field in the SB-2 header is set to zero and ignored by the channel.

If a channel sends an extended TIR, the control unit image ID of SB-2 Header 502 is the same as the control unit image ID received in the extended TIN 400. The channel image ID field of SB-2 Header 502 is set to zero and ignored by the control unit. If a control unit sends an extended TIR, the channel image ID in the SB-2 Header is the same as the channel image ID received in the extended TIN, and the control unit image ID in the SB-2 Header is set to zero and ignored by the channel.

Figure 6A:
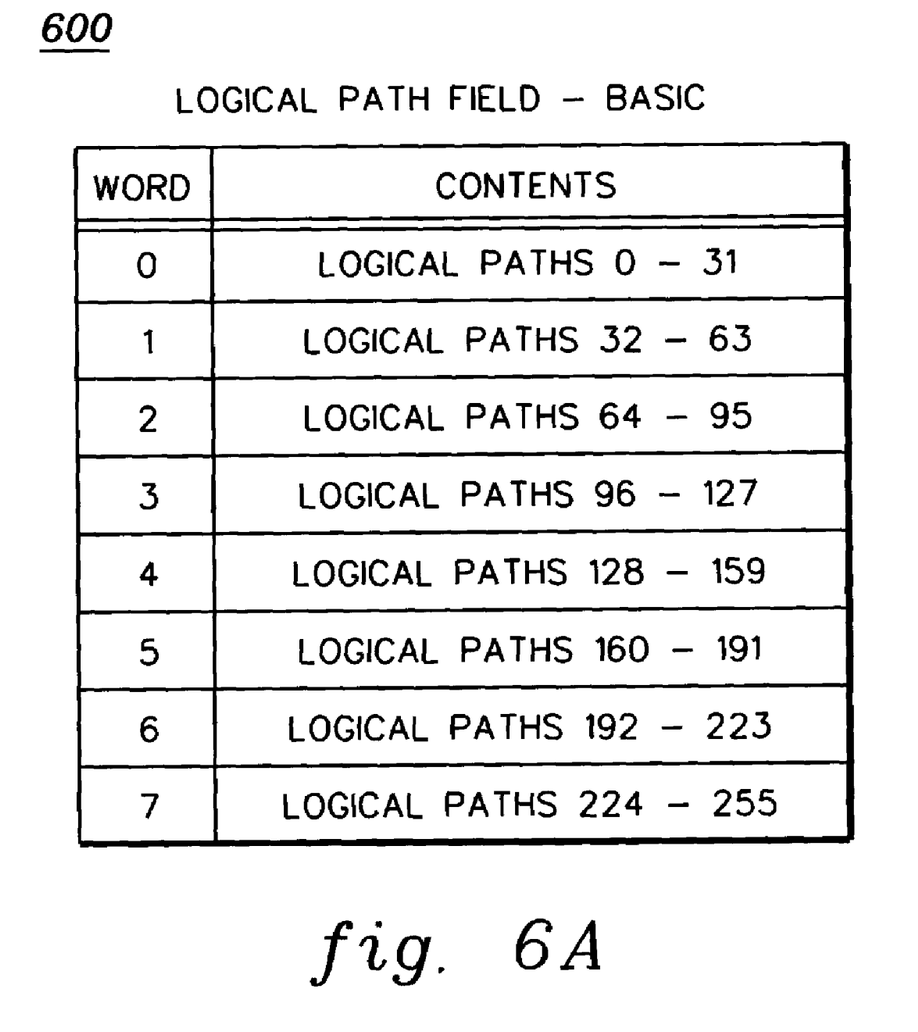
FIG. 6A depicts further details of one embodiment of the logical path field in a basic test initialization result packet of FIG. 5, in accordance with one or more aspects of the present invention.

One example of the format of a logical path field 600 in the Link Payload 506 of a basic TIR is depicted in FIG. 6A. Logical path field 600 is an 8 word or 32-byte field indicating whether each of the 256 possible logical paths from the logical images of the node that received the TIN is considered established with the node that sent the TIN. Each bit in logical path field 600 corresponds to a logical image ID, and is set to one if that logical path is established and set to zero otherwise.

Figure 6B:
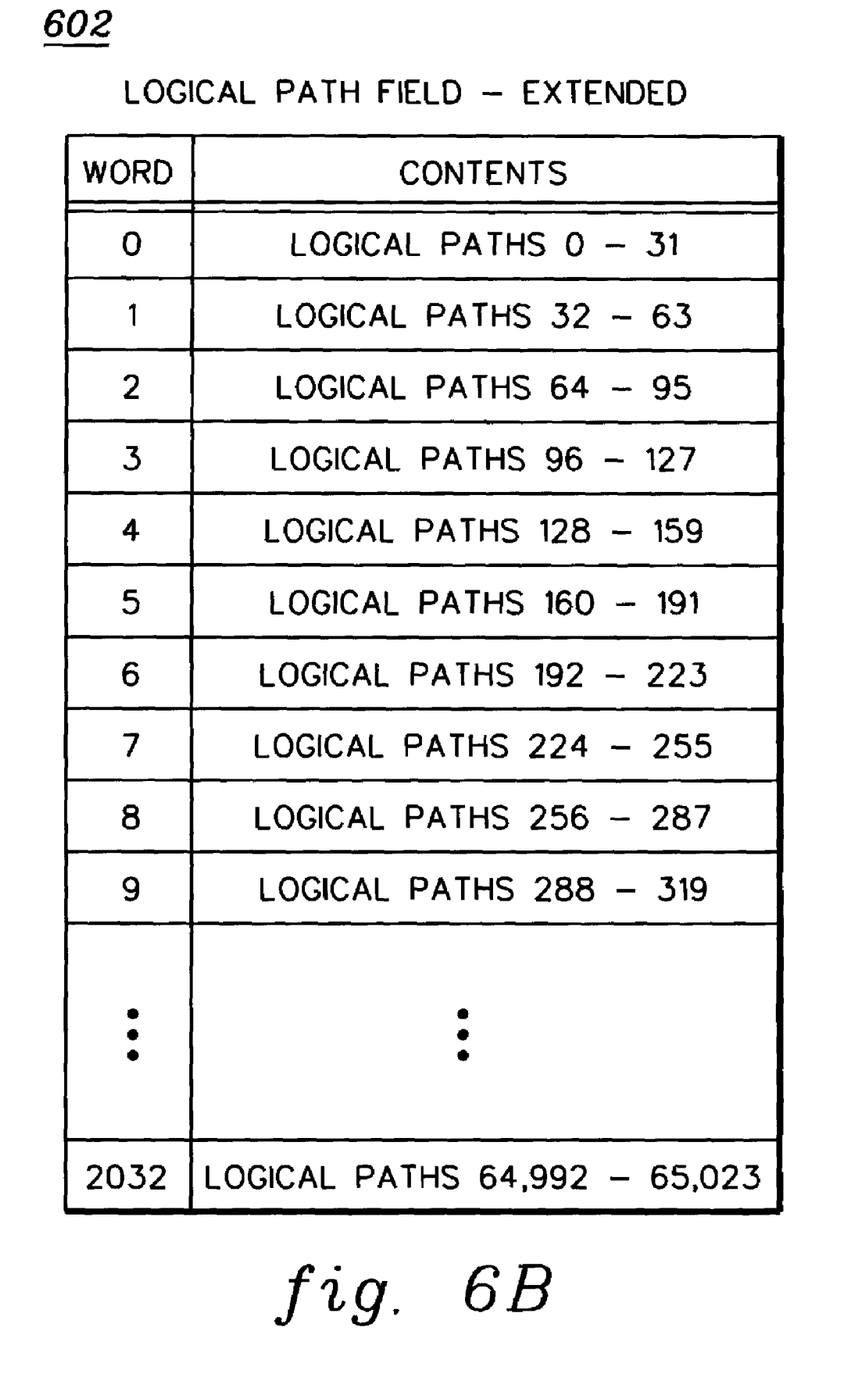
FIG. 6B depicts further details of one embodiment of the logical path field in an extended test initialization result packet of FIG. 5, in accordance with one or more aspects of the present invention.

Referring to FIG. 6B, one example of the format of a logical path field 602 in the Link Payload 506 of an extended TIR is depicted. By way of example, logical path field 602 may vary in length between 32 and 8128 bytes. The contents of the logical path field specify the logical paths that are recognized as being established by the node that received extended TIN 400, and which correspond to the range of logical image IDs specified in the received extended TIN. In the example shown in FIG. 6B, logical path field 602 is in an extended TIR returned in response to a TIN specifying the maximaum image-ID count (i.e., a maximum range of 254 logical image IDs). The first 256 bits (words 0 through 7) relate to the set of logical paths corresponding to the first logical image ID of the node that sent the TIN, bits 256–511 relate to the set of logical paths corresponding to the second logical image ID, and subsequent groups of 256 bits likewise relate to sets of 256 logical paths corresponding to consecutively increasing logical image IDs. The bit corresponding to a logical path is set to one if that logical path is established and is set to zero otherwise.

Although it is believed that this embodiment provides sufficient information in a single extended TIN to receive the relevant status information for the vast majority of cases, there may be rare scenarios that require the sending of a second extended TIN. For example, a node which sends an extended TIN in a FICON environment may have up to 256 logical images which require testing, but the image-ID count indicates a range of only 254 logical images. In the rare cases when the sending node has more than 254 logical images requiring testing, a first extended TIN could request state information for the first 254 logical images and a second extended TIN could request status of the remaining logical images. Even in these rare cases, the number of TIN packets required to request state information is an improvement over the basic TIN method by a factor of over 100.

Figure 7:
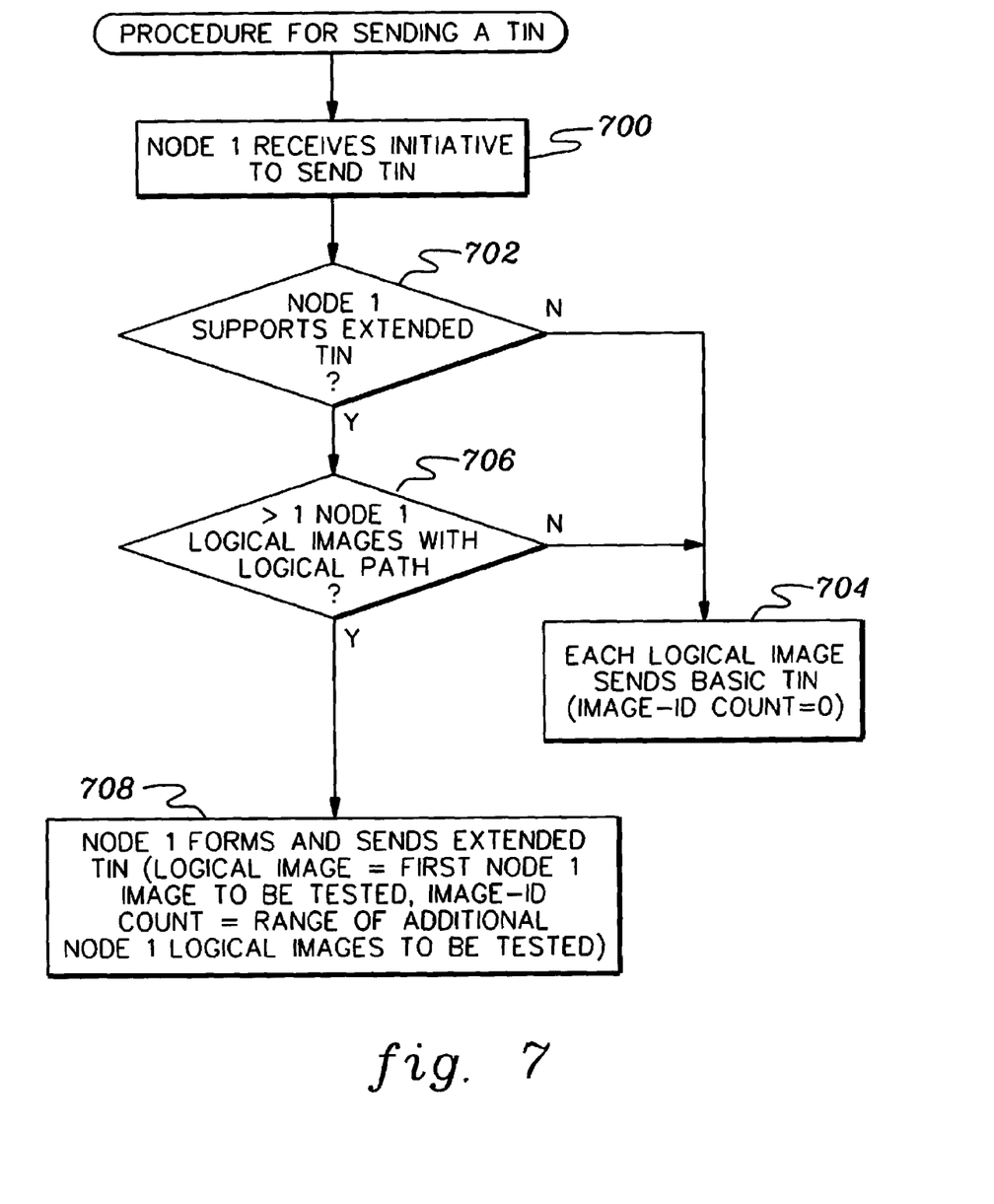
FIG. 7 depicts one embodiment of logic associated with sending a test initialization packet, in accordance with one or more aspects of the present invention.

One embodiment of the logic associated with forming and sending an extended TIN is described in detail with reference to FIG. 7. Initially, node 1 receives an initiative from, for instance, node 2 to send a TIN 700. This initiative may be prompted by an event such as a notification of a state change in node 2 when one or more logical paths are indicated as being established between node 1 and node 2. In other instances, the initiative may be received from the fibre channel switch fabric or a third node. If node 1 does not support an extended TIN 702 each logical image of node 1 sends a basic TIN in which the image-ID count is set to zero 704. If node 1 does support an extended TIN 702, and if the number of node 1 logical images having logical paths does not exceed one 706, each node 1 logical image sends a basic TIN in which the image-ID count is set to zero 704.

If, on the other hand, node 1 does support extended TIN packets 702, and if there are more than one node 1 logical images that have logical paths 706, node 1 forms and sends an extended TIN 708. This extended TIN includes a logical image ID set to the first node 1 logical image to be tested and an image-ID count set to the range of node 1 logical images to be tested 708.

Figure 8:
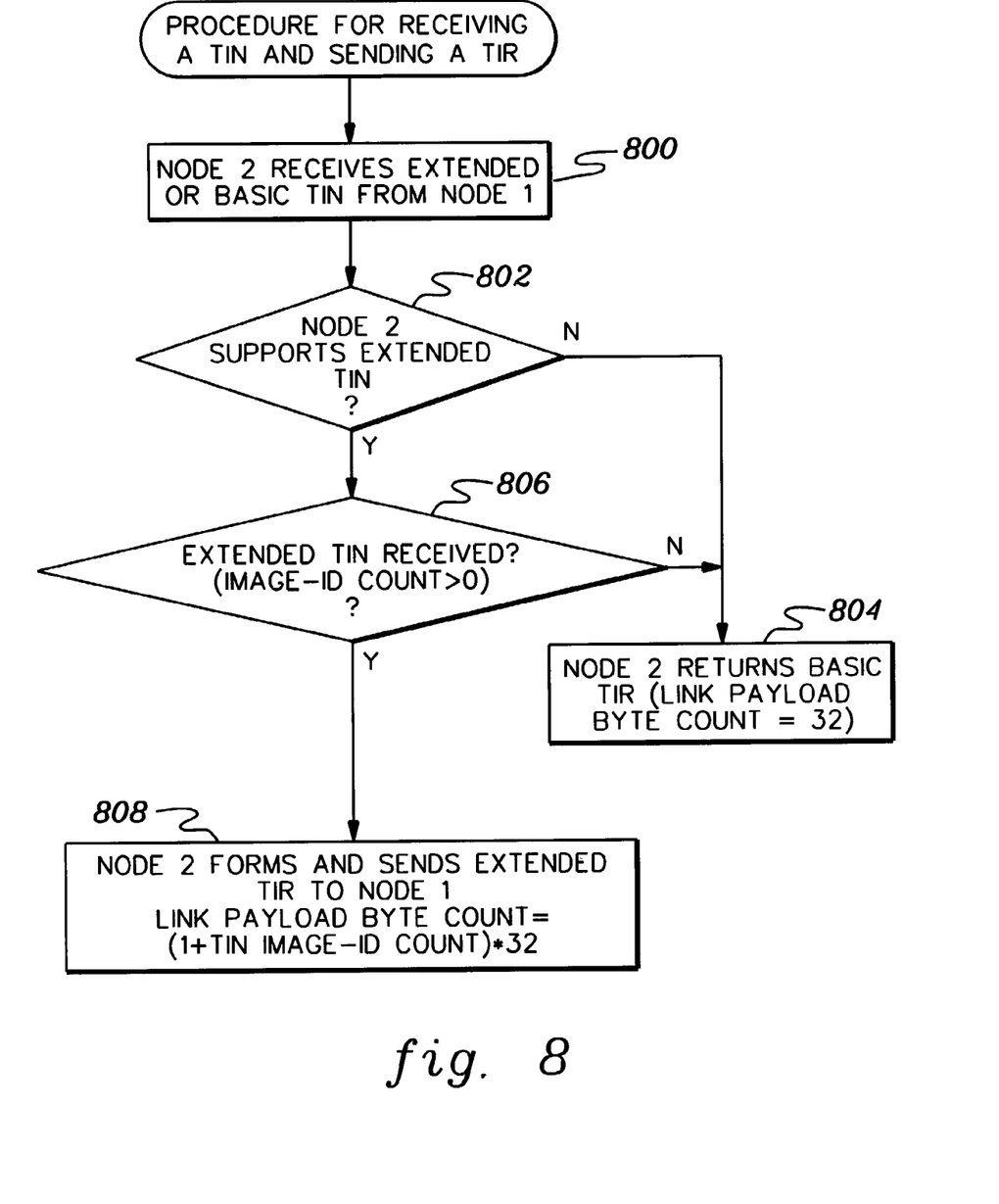
FIG. 8 depicts one embodiment of logic associated with receiving a test initialization packet and sending a test initialization result packet, in accordance with one or more aspects of the present invention.

One embodiment of processing of information after a TIN is sent is depicted in FIG. 8. In particular, FIG. 8 depicts one embodiment of processing steps performed in response to a node receiving a TIN. Node 2 receives an extended or basic TIN from node 1 800. If node 2 does not support extended TIN packets 802, node 2 sends a basic TIR with a link payload byte size of 32 in response to the received TIN 804. A basic TIR is also sent 804, if node 2 supports extended TIN packets and if the received TIN is not an extended TIN (i.e., the image-ID count is zero).

If node 2 supports extended TIN packets and the received TIN is an extended TIN (i.e., the image-ID count is greater than zero), then node 2 forms and sends an extended TIR to node 1 808. This extended TIR includes a link payload byte count of (1+image-ID count of the received TIN)*32.

Figure 9:
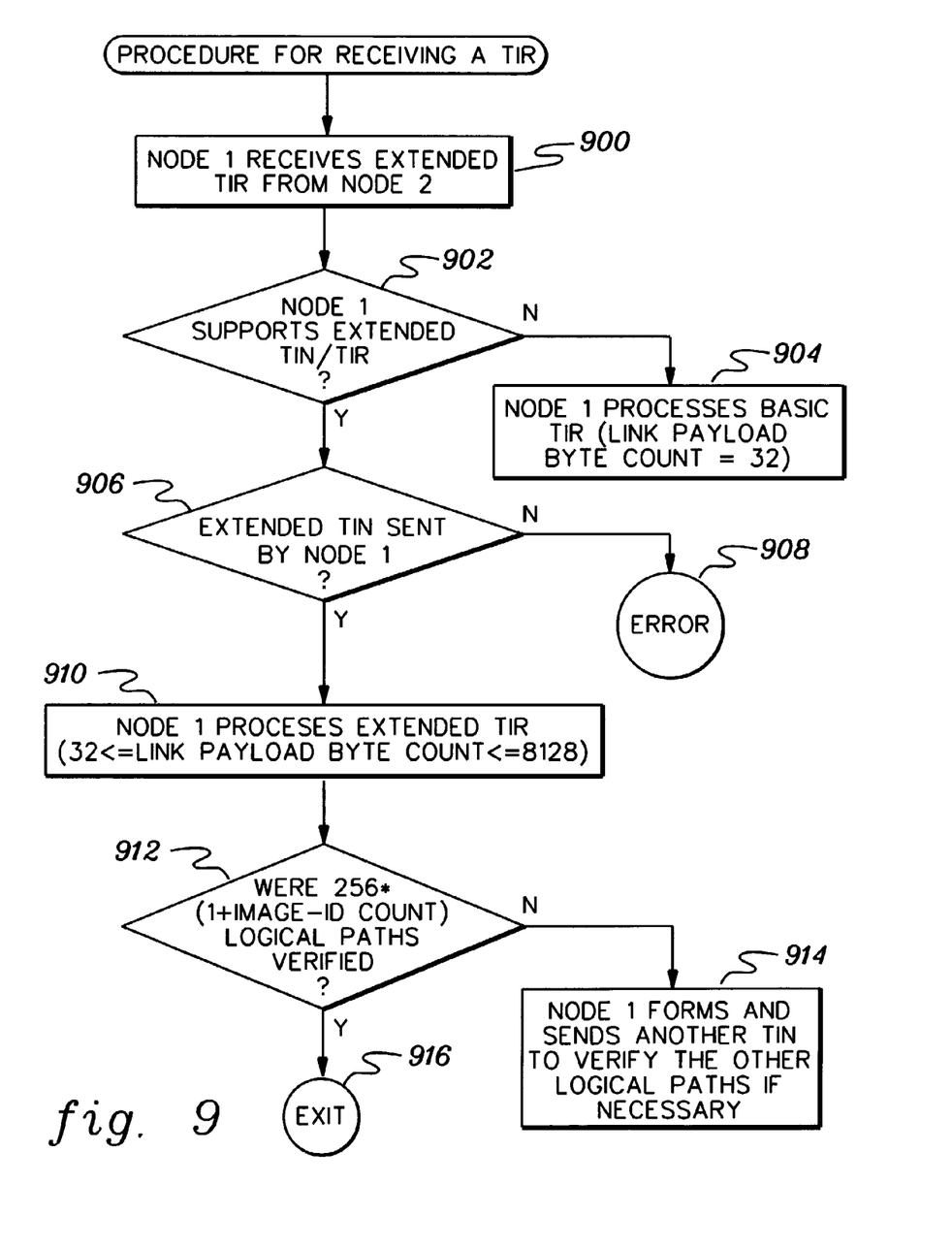
FIG. 9 depicts one embodiment of logic associated with receiving a test initialization result packet, in accordance with one or more aspects of the present invention.

One embodiment of the logic related to receiving a TIR is described below with reference to FIG. 9. Node 1 receives an extended TIR from node 2 900. If node 1 does not support extended TIN and TIR packets 902, node 1 processes a basic TIR with a link payload byte size of 32 904. If node 1 supports extended TIN and TIR packets 902, and if an extended TIN was not sent by node 1 906, then an error condition results 908.

Returning to the inquiries described above, if node 1 supports extended TIN and TIR packets 902, and if an extended TIN was sent 906, then node 1 processes the extended TIR, which includes a link payload size between 32 and 8128 bytes 910. If node 2 does not support extended TIN and TIR packets, it sends a basic TIR. In this case, node 1 may regard the basic TIR as an extended TIR with a link payload size of 32 bytes 910.

Thereafter, the number of logical paths verified is checked. If 256*(1+image-ID count) logical paths are not verified by node 1 912, then node 1 forms and sends another TIN to verify the other logical paths 914. If, on the other hand, 256*(1+image-ID count) logical paths are verified by node 1 912, then the procedure is completed 916.

Described in detail above is an enhanced capability for communicating state information of nodes in a network computing environment. In one example described herein, the node sending extended TIN 400 is a channel and the node receiving the extended TIN is a control unit. In other embodiments, the sending node can be a control unit and the receiving node can be channel. The nodes can also both be channels if one channel is emulating a control unit. Furthermore, the nodes can be both control units, if one control unit is acting as a channel.

The present invention can be included, for example, in an article of manufacture (e.g., one or more computer program products) having, for instance, computer usable media. This media has embodied therein, for instance, computer readable program code means for providing and facilitating the capabilities of the present invention. The article of manufacture can be included as part of the computer system or sold separately.

Additionally, at least one program storage device readable by machine, tangibly embodying at least one program of instructions executable by the machine, to perform the capabilities of the present invention, can be provided.

The flow diagrams depicted herein are provided by way of example. There may be variations to these diagrams or the steps (or operations) described herein without departing from the spirit of the invention. For instance, in certain cases, the steps may be performed in differing order, or steps may be added, deleted or modified. All of these variations are considered a part of the present invention as recited in the appended claims.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims. For example, the extended TIN and extended TIR processes described herein are not limited to a FICON-based network. These processes could be employed in another environment where state information is communicated between nodes.

What is claimed is:

1. A method of ascertaining state information in a network, said method comprising:
   forming an extended query at a first node requesting state information from at least one logical image of a second node, wherein the extended query comprises a single query requesting the state information for a plurality of logical images of the first node; and
   sending the extended query from said first node to said second node.

2. The method of claim 1, wherein said requesting state information comprises requesting status of a plurality of logical paths previously established between the plurality of logical images of the first node and the at least one logical image of the second node.

3. The method of claim 1, wherein said forming comprises forming said extended query to have a logical image identification and a logical image count, wherein said logical image identification specifies a first logical image of the plurality of logical images of the first node having a plurality of logical paths previously established to the second node and said logical image count specifies a range of the plurality of logical images, wherein said first logical image and said range specify a set of logical images.

4. The method of claim 1, further comprising forming an extended response at the second node, responsive to the extended query from the first node, wherein said extended response includes state information of the at least one logical image of the second node.

5. The method of claim 1, wherein said forming the extended response further comprises representing the state information as a binary vector.

6. The method of claim 1, further comprising receiving, at the first node, state information from the at least one logical image of the second node in response to the extended query from the first node.

7. The method of claim 1, wherein the network comprises one of a point to point network and a fibre channel switch fabric network, wherein if the network comprises a point to point network, the first node and the second node are coupled point to point, and if the network comprises a fibre channel switch fabric network, the first node and the second node are connected across a fibre channel switch fabric.

8. The method of claim 1, wherein the first node is one of a first channel and a first control unit, and the second node is one of a second channel and a second control unit.

9. The method of claim 1, wherein said forming comprises forming the extended query to request state information from a plurality of logical images of the second node.

10. The method of claim 1, wherein said forming comprises forming the extended query responsive to an initiative sent from one of the second node, a third node and a fibre channel switch fabric, wherein said initiative directs the first node to send a query to the second node requesting state information.

11. A system for ascertaining state information in a network, said system comprising:
   means for forming an extended query at a first node requesting state information from at least one logical image of a second node, wherein the extended query comprises a single query requesting the state information for a plurality of logical images of the first node; and
   means for sending the extended query from said first node to said second node.

12. The system of claim 11, wherein said means for forming comprises means for forming said extended query to request status of a plurality of logical paths previously established between the plurality of logical images of the first node and the at least one logical image of the second node.

13. The system of claim 11, wherein said means for forming comprises means for forming said extended query to have a logical image identification and a logical image count, wherein said logical image identification specifies a first logical image of the plurality of logical images of the first node having at least one logical path previously established to the second node and said logical image count specifies a range of the plurality of logical images, wherein said first logical image and said range specify a set of logical images.

14. The system of claim 11, further comprising means for forming an extended response at the second node, responsive to the extended query from the first node, wherein said extended response includes state information of the at least one logical image of the second node.

15. The method of claim 14, wherein said means for forming the extended response comprises means for representing the state information as a binary vector.

16. The system of claim 11, further comprising means for receiving, at the first node, state information from the at least one logical image of the second node in response to the extended query from the first node.

17. The system of claim 11, wherein the network comprises one of a point to point network and a fibre channel switch fabric network, wherein if the network comprises a point to point network, the first node and the second node are coupled point to point, and if the network comprises a fibre channel switch fabric network, the first node and the second node are connected across a fibre channel switch fabric.

18. The system of claim 11, wherein the first node is one of a first channel and a first control unit, and the second node is one of a second channel and a second control unit.

19. The system of claim 11, wherein said means for forming comprises means for requesting state information from a plurality of logical images of the second node.

20. The system of claim 11, wherein said means for forming comprises means for forming the extended query responsive to an initiative sent from one of the second node, a third node and a fibre channel switch fabric, wherein said initiative directs the first node to send a query to the second node requesting state information.

21. A system for ascertaining state information in a network, said system comprising:
   a channel unit or a control unit adapted to form an extended query at a first node requesting state information from at least one logical image of a second node, wherein the extended query comprises a single query requesting the state information for a plurality of logical images of the first node; and
   wherein said unit is further adapted to send the extended query from said first node to said second node.

22. At least one program storage device readable by a machine, tangibly embodying at least one program of instructions executable by the machine to perform a method of ascertaining state information in a network, said method comprising:
   forming an extended query at a first node requesting state information from at least one logical image of a second node, wherein the extended query comprises a single query requesting the state information for a plurality of logical images of the first node; and
   sending the extended query from said first node to said second node.

23. The at least one program storage device of claim 22, wherein said requesting state information comprises requesting status of a plurality of logical paths previously established between the plurality of logical images of the first node and the at least one logical image of the second node.

24. The at least one program storage device of claim 22, wherein said forming comprises forming said extended query to have a logical image identification and a logical image count, wherein said logical image identification specifies a first logical image of the plurality of logical images of the first node having at least one logical path previously established to the second node and said logical image count specifies a range of the plurality of logical images, wherein said first logical image and said range specify a set of logical images.

25. The at least one program storage device of claim 22, further comprising forming an extended response at the second node, responsive to the extended query from the first node, wherein said extended response includes state information of the at least one logical image of the second node.

26. The at least one program storage device of claim 25, wherein said forming the extended response comprises representing the state information as a binary vector.

27. The at least one program storage device of claim 22, further comprising receiving, at the first node, state information from the at least one logical image of the second node in response to the extended query from the first node.

28. The at least one program storage device of claim 22, wherein the network comprises one of a point to point network and a fibre channel switch fabric network, wherein if the network comprises a point to point network, the first node and the second node are coupled point to point, and if the network comprises a fibre channel switch fabric network, the first node and the second node are connected across a fibre channel switch fabric.

29. The at least one program storage device of claim 22, wherein the first node is one of a first channel and a first control unit, and the second node is one of a second channel and a second control unit.

30. The at least one program storage device of claim 22, wherein said forming comprises requesting state information from a plurality of logical images of the second node.

31. The at least one program storage device of claim 22, wherein said forming comprises forming the extended query responsive to an initiative sent from one of the second node, a third node and a fibre channel switch fabric, wherein said initiative directs the first node to send a query to the second node requesting state information.

32. A data structure for ascertaining state information in a network computing environment, said data structure comprising:
- an extended query requesting state information for a first node from at least one logical image of a second node, the extended query comprising:
  - a first field including an identifier of a first logical image of the first node having a plurality of logical images, wherein a plurality of logical paths were previously established between the plurality of logical images of the first node and the at least one logical image of a second node;
  - a second field including a count, wherein the count specifies a range of logical images of the plurality of logical images; and
  - wherein incrementing said identifier using said count specifies a number of logical images of the plurality of logical images of the first node requesting state information from the second node.

33. The data structure of claim 32, further comprising:
- an extended response having state information for the first node from the at least one logical image of the second node, the extended response comprising:
  - a third field including status of said plurality of logical paths, wherein said status indicates whether the logical paths of the plurality of logical paths are currently established.

\* \* \* \* \*